US012515249B2

(12) United States Patent
Yan et al.

(10) Patent No.: US 12,515,249 B2
(45) Date of Patent: Jan. 6, 2026

(54) STRIP MATERIAL CUTTING DEVICE AND STACKING APPARATUS

(71) Applicant: Guangdong Lyric Robot Automation Co., Ltd., Huizhou (CN)

(72) Inventors: Fengwei Yan, Huizhou (CN); Jianfeng Zhu, Huizhou (CN); Hengjian Liang, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 200 days.

(21) Appl. No.: 18/279,835

(22) PCT Filed: Nov. 30, 2022

(86) PCT No.: PCT/CN2022/135559
§ 371 (c)(1),
(2) Date: Aug. 31, 2023

(87) PCT Pub. No.: WO2023/142660
PCT Pub. Date: Aug. 3, 2023

(65) Prior Publication Data
US 2024/0307947 A1    Sep. 19, 2024

(30) Foreign Application Priority Data

Jan. 28, 2022   (CN) .......................... 202210107836.6

(51) Int. Cl.
*B21D 43/28*   (2006.01)
*B21D 28/04*   (2006.01)
*B21D 43/09*   (2006.01)

(52) U.S. Cl.
CPC ........... *B21D 43/287* (2013.01); *B21D 28/04* (2013.01); *B21D 43/09* (2013.01)

(58) Field of Classification Search
CPC ...... B21D 43/278; B21D 43/09; B21D 28/04; B21D 28/02; B26D 1/605; B65H 35/06
(Continued)

(56) References Cited

U.S. PATENT DOCUMENTS 10,369,615 B2 *   8/2019   Tsukamoto ......... B29C 65/5007

FOREIGN PATENT DOCUMENTS

CN   102306744 A   1/2012
CN   102306744 B * 9/2013
(Continued)

OTHER PUBLICATIONS

Translation CN 102306744 (Year: 2025).*
(Continued)

*Primary Examiner* — Nhat Chieu Q Do
(74) *Attorney, Agent, or Firm* — Daylight Law, P.C.

(57) ABSTRACT

A strip material cutting device and a stacking apparatus are disclosed. The strip material cutting device includes a die-cutting module and a first temporary storage module, the die-cutting module is capable of moving in a reciprocating manner along a conveying line of a strip material, and the die-cutting module includes a first upper cutting die and a first lower cutting die capable of moving close to each other so as to cut the strip material. The first temporary storage module is located upstream of the die-cutting module. The first temporary storage module includes a first temporary storage roller that is capable of moving to temporarily store or release the strip material and is configured for enabling, during cutting, the die-cutting module and the strip material to be relatively stationary in a conveying direction of the strip material.

4 Claims, 8 Drawing Sheets

(58) Field of Classification Search
USPC .......................................................... 83/78
See application file for complete search history.

(56) References Cited

FOREIGN PATENT DOCUMENTS

| CN | 203991896 U | 12/2014 |
| --- | --- | --- |
| CN | 105565036 A | 5/2016 |
| CN | 110355259 A | 10/2019 |
| CN | 209954194 U | 1/2020 |
| CN | 209986063 U | 1/2020 |
| CN | 111702032 A | 9/2020 |
| CN | 112635809 A | 4/2021 |
| CN | 212893114 U | 4/2021 |
| CN | 213037097 U | 4/2021 |
| CN | 215248597 U | 12/2021 |
| CN | 114472673 A | 5/2022 |
| CN | 114472674 A | 5/2022 |
| FR | 1230209 A | 9/1960 |
| JP | 2013184259 A | 9/2013 |
| JP | 2014114165 A | 6/2014 |
| KR | 101447365 B1 | 10/2014 |

OTHER PUBLICATIONS

First Office Action dated Jul. 6, 2023 from International Application No. PCT/CN2022/135559.
International Search Report dated Feb. 26, 2023 from International Application No. PCT/CN2022/135559.
Written Opinion dated Feb. 26, 2023 from International Application No. PCT/CN2022/135559.
Decision of Rejection dated Mar. 1, 2024 from the Chinese Application No. 202210107836.6, 12 pages.
First Office Action dated Aug. 22, 2024 from the European Application No. 22923451.3, 7 pages.
J. Li. (2009). (Ed.) Fundamentals of mechatronic system design (pp. 250-252). Central Radio and Television University Press.
Second Office Action dated Dec. 6, 2023 from the Chinese Application No. 202210107836.6, 12 pages.
Supplementary Search dated Nov. 30, 2023 from CN Application No. 202210107836.6, 4 pages.

* cited by examiner

STRIP MATERIAL CUTTING DEVICE AND STACKING APPARATUS

CROSS-REFERENCE TO RELATED APPLICATIONS

This application is a national stage filing under 35 U.S.C. § 371 of international application number PCT/CN2022/135559, filed Nov. 30, 2022, which claims priority to Chinese patent application No. 2022101078366 filed Jan. 28, 2022. The contents of these applications are incorporated herein by reference in their entirety.

TECHNICAL FIELD

The present application relates to the field of electrode plate manufacturing, and particularly to a strip material cutting device and a stacking apparatus.

BACKGROUND

A strip material is generally conveyed by a conveying line, which needs to be repeatedly paused and resumed in traditional strip material cutting. A section of the strip material is first conveyed to a cutting station, and then the conveying is paused for cutting, and after the cutting is finished, the conveying line is resumed to convey a subsequent strip material to the cutting station, causing the production speed to be difficult to increase.

Strip materials are cut by means of a follow-up cutting method in some current battery cell production technologies. The strip material is continuously conveyed, a cutter at the cutting station follows the strip material, and when the movement speed of the cutter in a conveying direction of the strip material is synchronized with the speed of the strip material, the cutter moves in a width direction of the strip material to cut off the strip material, and then resets for the next round of follow-up cutting after cutting off the strip material. The production speed of battery cells can be increased by using the follow-up cutting method because the strip material is continuously conveyed in a cutting process.

However, the application of the follow-up cutting method is currently limited to a battery cell winding process, and the cutter used in a winding process only needs to cut off the strip material while moving in the width direction of the strip material. In addition, in a battery cell stacking process, it is required to cut the strip material so as to obtain a single electrode plate. Typically, a contour of the electrode plate shall be formed first by means of die cutting, and the strip material is then cut off. For the die cutting of the strip material, since an upper cutting die and a lower cutting die need to complete a die-cutting action within a short time and a cut edge has a complicated shape, it is difficult to keep the strip material, the upper cutting die and the lower cutting die stationary relatively during cutting, and the cut edge has poor quality during the die-cutting using the follow-up cutting method.

SUMMARY

The present application is intended to solve at least one of the technical problems existing in the prior art. In view of this, the present application provides a strip material cutting device and a stacking apparatus. The strip material cutting device can improve the quality of a cut edge during die cutting performed using a follow-up cutting method.

The strip material cutting device according to the present application comprises a die-cutting module and a first temporary storage module; the die-cutting module is capable of moving in a reciprocating manner along a conveying line of a strip material, the die-cutting module comprises a first upper cutting die and a first lower cutting die, and the first upper cutting die and the first lower cutting die are capable of moving close to each other so as to cut the strip material; the first temporary storage module is located upstream of the die-cutting module, the first temporary storage module comprises a first temporary storage roller capable of moving to temporarily store or release the strip material, and the first temporary storage module is configured for enabling, during cutting, the die-cutting module and the strip material to be relatively stationary in a conveying direction of the strip material.

The strip material cutting device according to the present application has at least the following technical effects. When the die-cutting module performs cutting, the first temporary storage module can temporarily store or release a part of the strip material, thereby compensating for a speed difference between the strip material and the die-cutting module, and further ensuring a relative stationary state of the die-cutting module and the strip material in the conveying direction of the strip material during cutting, so that the strip material cutting device can improve the quality of a cut edge when performing the die-cutting using the follow-up cutting method.

According to some embodiments of the present application, the first temporary storage module comprises a first tension member, and the first tension member drives the first temporary storage roller to compress the strip material by exerting an acting force on the first temporary storage roller.

According to some embodiments of the present application, the first temporary storage module further comprises a first elastic member, and the first elastic member is configured for balancing the gravity of the first temporary storage roller by means of elasticity thereof.

According to some embodiments of the present application, the first temporary storage module comprises first delivery rollers and a first guide rail, the first delivery rollers are arranged at an interval, and the first temporary storage roller is mounted on the first guide rail.

According to some embodiments of the present application, the strip material cutting device comprises a connecting rod unit, the connecting rod unit is located on one side of the die-cutting module, connected to the die-cutting module, and configured for driving the die-cutting module to move in a reciprocating manner along the conveying line of the strip material.

According to some embodiments of the present application, the connecting rod unit comprises a cam and a swing rod, and the cam is in transmission connection with the die-cutting module by means of the swing rod, and is capable of driving the swing rod to swing.

According to some embodiments of the present application, the swing rod comprises a first arm and a second arm, the second arm is mounted on the first arm, connected to the cam and adjustable in mounting position, the connecting rod unit comprises a connecting seat fixed on a first die frame, and the first arm is connected to the connecting seat by means of a guide rail and slider mechanism.

According to some embodiments of the present application, the cam is provided with a cam groove, and the connecting rod unit comprises a second sliding seat, a second sliding table, a first sliding seat and a first sliding table; the first sliding seat extends in a first direction, the first direction is parallel to the conveying direction of the strip material, and the first sliding table is mounted on the first sliding seat; the second sliding seat is mounted on the second sliding table and extends in a second direction, the second sliding table is mounted on the second sliding seat, the second sliding seat is connected to the cam groove, and the second sliding table is connected to the swing rod; the connecting rod unit further comprises a third elastic member, and the third elastic member is connected to the second sliding seat and configured for driving the second sliding seat to compress a side wall of the cam groove.

According to some embodiments of the present application, the strip material cutting device comprises a cutting module and a second temporary storage module, the second temporary storage module is located downstream of the die-cutting module, and the cutting module is located downstream of the second temporary storage module; the cutting module is capable of moving in a reciprocating manner along the conveying line of the strip material and comprises a second upper cutting die and a second lower cutting die, and the second upper cutting die and the second lower cutting die are capable of moving close to each other so as to cut off the strip material; the second temporary storage module is configured for enabling, during cutting, the cutting module and the strip material to be relatively stationary in the conveying direction of the strip material.

According to some embodiments of the present application, the strip material cutting device comprises a first waste material box and a second waste material box, the first waste material box comprises a first waste material inlet located below the die-cutting module, and the second waste material box comprises a second waste material inlet located below the cutting module.

According to some embodiments of the present application, the strip material cutting device comprises a dust removal unit and a detection unit, the dust removal unit and the detection unit are both located between the die-cutting module and the cutting module, the detection unit is located downstream of the dust removal unit and comprises a detection camera, and the dust removal unit comprises an air knife and a brush.

The stacking apparatus according to the application comprises the strip material cutting device provided by the present application.

The stacking apparatus according to the application has at least the following beneficial effects. By using the strip material cutting device provided by the present application, the first temporary storage module can temporarily store or release a part of the strip material when the die-cutting module cuts the strip material, thereby better ensuring, during cutting, the relative stationary state of the die-cutting module and the strip material in the conveying direction of the strip material.

BRIEF DESCRIPTION OF DRAWINGS

The above and/or additional aspects and advantages of the present application will become apparent and easily comprehensible from the following description of embodiments in conjunction with the accompanying drawings, in which.

LIST OF REFERENCE NUMERALS

Figure 1:
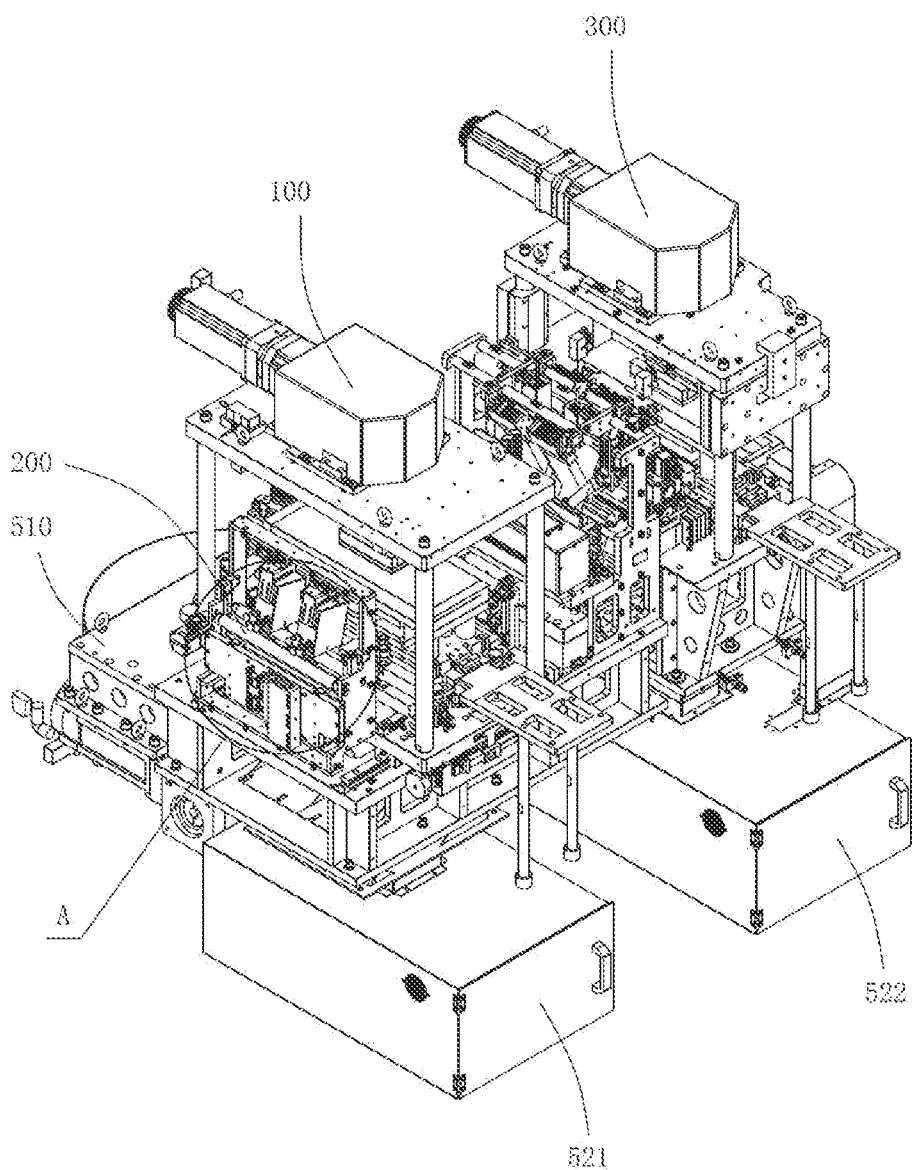
FIG. 1 is an isometric schematic diagram of a strip material cutting device according to an embodiment of the present application.

100. Die-cutting module; 110. First upper cutting die; 120. First lower cutting die; 130. First die frame; 200. First temporary storage module; 210. First tension member; 220. First delivery roller; 230. First mounting rack; 240. First elastic member; 300. Cutting module; 310. Second upper cutting die; 320. Second lower cutting die; 330. Second die frame; 400. Second temporary storage module; 410. Second tension member; 420. Second delivery roller; 430. Second mounting rack; 440. Second elastic member; 510. Connecting rod unit; 511. Cam; 512. First arm; 513. Second arm; 514. Connecting seat; 515. Second sliding seat; 516. Second sliding table; 517. Third elastic member; 521. First waste material box; 522. Second waste material box; 530. Dust removal unit; 540. Detection unit; 600. Rack; 500. Guide rail and slider mechanism; 520. Swing rod.

DETAILED DESCRIPTION

Embodiments of the present application will be described below in detail, and examples of the embodiments are shown in the drawings, wherein the same or similar reference numerals represent the same or similar elements or elements having the same or similar functions throughout. The embodiments described below with reference to the accompanying drawings are examples, and are intended to explain the present application, but shall not be understood as a limitation on the present application.

In the description of the present application, it should be understood that the orientations or the position relationships indicated by the terms such as "upper", "lower", "front", "rear", "left" and "right" are based on the orientations or the position relationships shown in the accompanying drawings, which are only for ease of description of the present application and for simplifying the description, rather than indicating or implying that the devices or elements referred to necessarily have a specific orientation, constructed and operated in a specific orientation, and therefore cannot be construed as limiting the present application.

In the description of the present application, the term "several" means one or more, the term "a plurality of" means two or more, the expressions such as greater than, less than or exceeding a certain value may be construed as not including the value, and the expressions such as above, below or within a certain value may be construed as including the value. The terms "first" and "second" described are intended to distinguish the technical features only and should not be construed as indicating or implying relative importance or implicitly indicating the number of technical features indicated.

In the description of the present application, unless otherwise clearly defined, words such as provision, mounting, and connection should be construed in a broad sense, and those of ordinary skill in the art wound have been able to reasonably determine the specific meanings of the above words in the description of the present application in combination with the specific content of the technical solution.

First of all, the technical problems of a current follow-up cutting method will be further explained as follows.

In the current follow-up cutting method, a cutter typically moves from one side to the other side of a strip material, thereby gradually cutting off the strip material in this process. For example, a rolling cutter is used, and after the speed of the cutter and the speed of the strip material are synchronized in a conveying direction of the strip material, the cutter compresses the strip material and rolls in a width direction of the strip material such that a blade cuts the strip material into two sections.

The cutter used in the current follow-up cutting method cuts off the strip material gradually, the area of the strip material on which the cutter acts is small at any time, an acting force exerted by the cutter on the strip material has a limited effect in the cutting process, and therefore a cutting action has a small impact on a conveying speed of the strip material.

However, the cutting speed of die-cutting is higher, the cutting dies simultaneously cut the strip material in die closing. During the cutting, since the force exerted on the strip material is larger and the action area is wider, a larger impact on the strip material is caused at the moment of cutting, resulting in a change in the conveying speed of the strip material at a cutting position. The difference between the speed of the strip material and the speeds of the cutting dies may cause the strip material to hunch up or to be tensioned at the cutting position, severely affecting the quality of a cut edge. This situation is not obvious when the conveying speed of the strip material is low, but is prominent under the operating condition where the conveying speed of the strip material is high.

Moreover, since the cutting action is completed instantly during die cutting, the speed of the strip material and the speed of the cutting dies at this moment cannot be completely synchronized in the conveying direction of the strip material, which also adversely affects the quality of the cut edge.

Considering the above technical problems, it is difficult to well combine a current die-cutting method with the follow-up cutting method, and it is impossible to further popularize and apply the follow-up cutting method in an electrode plate stacking process.

The present application provides a strip material cutting device, which comprises a die-cutting module 100 and a first temporary storage module 200; the die-cutting module 100 is capable of moving in a reciprocating manner along a conveying line of a strip material, the die-cutting module 100 comprises a first upper cutting die 110 and a first lower cutting die 120, and the first upper cutting die 110 and the first lower cutting die 120 are capable of moving close to each other so as to cut the strip material; the first temporary storage module 200 is located upstream of the die-cutting module 100, the first temporary storage module 200 comprises a first temporary storage roller capable of moving to temporarily store or release the strip material, and the first temporary storage module 200 is configured for enabling the die-cutting module 100 and the strip material to be relatively stationary in the conveying direction of the strip material.

According to the strip material cutting device provided by the present application, when the die-cutting module 100 performs cutting, the first temporary storage module 200 can temporarily store or release a part of the strip material, thereby compensating for a speed difference between the strip material and the die-cutting module 100, and further ensuring, during cutting, a relative stationary state of the die-cutting module 100 and the strip material in the conveying direction of the strip material.

It can be understood that since the first temporary storage module 200 temporarily stores a part of the strip material, when the strip material at a cutting position hunches up at the moment of cutting, the first temporary storage module 200 can temporarily store more strip material; when the strip material at the cutting position is tensioned at the moment of cutting, the first temporary storage module 200 can release a part of the temporarily stored strip material, thereby compensating for the speed difference between the strip material and the die-cutting module, such that the tensioned strip material tends to be normal, and the quality of a cut edge is improved during die cutting performed using a follow-up cutting method.

In some embodiments, the first temporary storage module 200 comprises a first tension member 210, and the first tension member 210 drives the first temporary storage roller to compress the strip material by exerting an acting force on the first temporary storage roller. The first tension member 210 can achieve passive temporary storage of the first temporary storage roller. When the strip material is normally conveyed, the acting force of the first tension member 210 on the first temporary storage roller is balanced with the acting force of the strip material on the first temporary storage roller. When the strip material at the cutting position hunches up, the acting force of the strip material on the first temporary storage roller decreases, and the first tension member 210 drives the first temporary storage roller to further compress the strip material such that the first temporary storage module 200 temporarily stores a part of the strip material. When the strip material at the cutting position is excessively tensioned, the acting force of the strip material on the first temporary storage roller increases, and the acting force of the strip material on the first temporary storage roller overcomes the acting force of the first tension member 210 on the first temporary storage roller such that the first temporary storage module 200 releases a part of the strip material until a force balance state is reached again.

The first temporary storage roller can achieve temporary storage in a swinging or moving manner. In some embodiments, the first temporary storage module 200 comprises a plurality of first delivery rollers 220 and a first guide rail. The two first delivery rollers 220 are arranged in a spaced manner, and the first temporary storage roller is mounted on the first guide rail, is located between the two first delivery rollers 220, and is capable of moving close to or far away from the first delivery rollers 220.

Figure 4:
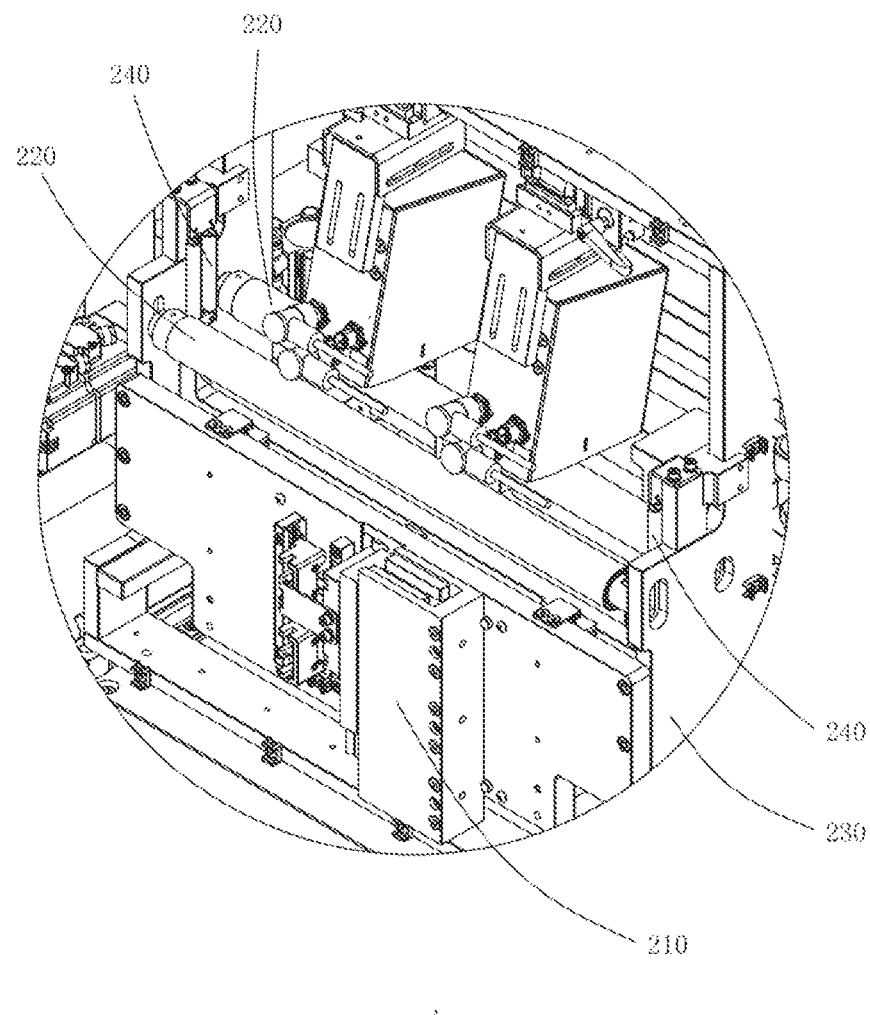
FIG. 4 is partial enlarged view of part A in FIG. 1.

Referring to the embodiments shown in FIGS. 1 and 4, the first temporary storage module 200 comprises a first mounting rack 230 and a first movable frame, the first delivery rollers 220 and the first guide rail are mounted on the first mounting rack 230, the first delivery rollers 220 are arranged in the spaced manner, the first movable frame is mounted on the first guide rail, and the first temporary storage roller is mounted on the first movable frame and located between the two first delivery rollers 220. The strip material passes between the first temporary storage roller and the first delivery rollers 220, and the first temporary storage roller moves along the first guide rail so as to temporarily store or release the strip material. Specifically, the first tension member 210 is a linear motor and is connected to the first movable frame, the linear motor exerts a constant acting force on the first temporary storage roller, and when the acting force of the first temporary storage roller on the strip material does not match a counter-acting force of the strip material on the first temporary storage roller, the first temporary storage roller moves on the linear motor until the force balance is reached again. By using the linear motor, the smoothness of movement of the first temporary storage roller can be improved, making the response of the first temporary storage roller faster.

In some embodiments, the first temporary storage module 200 further comprises a first elastic member 240, and the first elastic member 240 is configured for balancing the gravity of the first temporary storage roller by means of elasticity thereof. The first elastic member 240 can reduce the impact of the gravity of the first temporary storage roller on the driving of the first tension member 210, further improving the smoothness of movement of the first temporary storage roller, and making the response of the first temporary storage roller faster.

Of course, it may also be possible to control the first temporary storage roller to perform temporary storage in other manners, for example, by means of the elasticity of a spring or the gravity of a structure.

According to some embodiments of the present application, the strip material cutting device comprises a connecting rod unit 510, and the connecting rod unit 510 is located on one side of a first die frame 130, is connected to the die-cutting module 100, and is configured for driving the die-cutting module 100 to move in a reciprocating manner along the conveying line of the strip material. In some embodiments, the die-cutting module 100 comprises a first die frame 130, the first upper cutting die 110 and the first lower cutting die 120 are mounted on the first die frame 130, and the connecting rod unit 510 is connected to the first die frame 130.

It can be understood that the current follow-up cutting method is configured for cutting off the strip material, and the cutter is generally driven to perform follow-up cutting by the linear motor below the cutter. However, when die-cutting an electrode plate of a battery cell, the die-cutting module 100 needs to cut the strip material so as to form a basic contour of the electrode plate, for example, a tab portion of the electrode plate, such that a cutting area is large, and a lot of waste material are generated during cutting and fall to the position below the die-cutting module 100. If the linear motor is still configured for driving below the die-cutting module, it may cause interference of the linear motor with a waste material discharging channel and may also cause damage to the linear motor by the waste material.

According to the present application, the die-cutting module 100 is driven by the connecting rod unit 510 located on one side of the die-cutting module 100, such that a structure below the die-cutting module 100 is simplified, and an action of the connecting rod unit 510 is less likely affected by the waste material.

In some embodiments, the connecting rod unit 510 comprises a cam 511 and a swing rod 520, and the cam 511 is in transmission connection with the first die frame 130 by means of the swing rod 520 and is capable of driving the swing rod 520 to swing.

Figure 6:
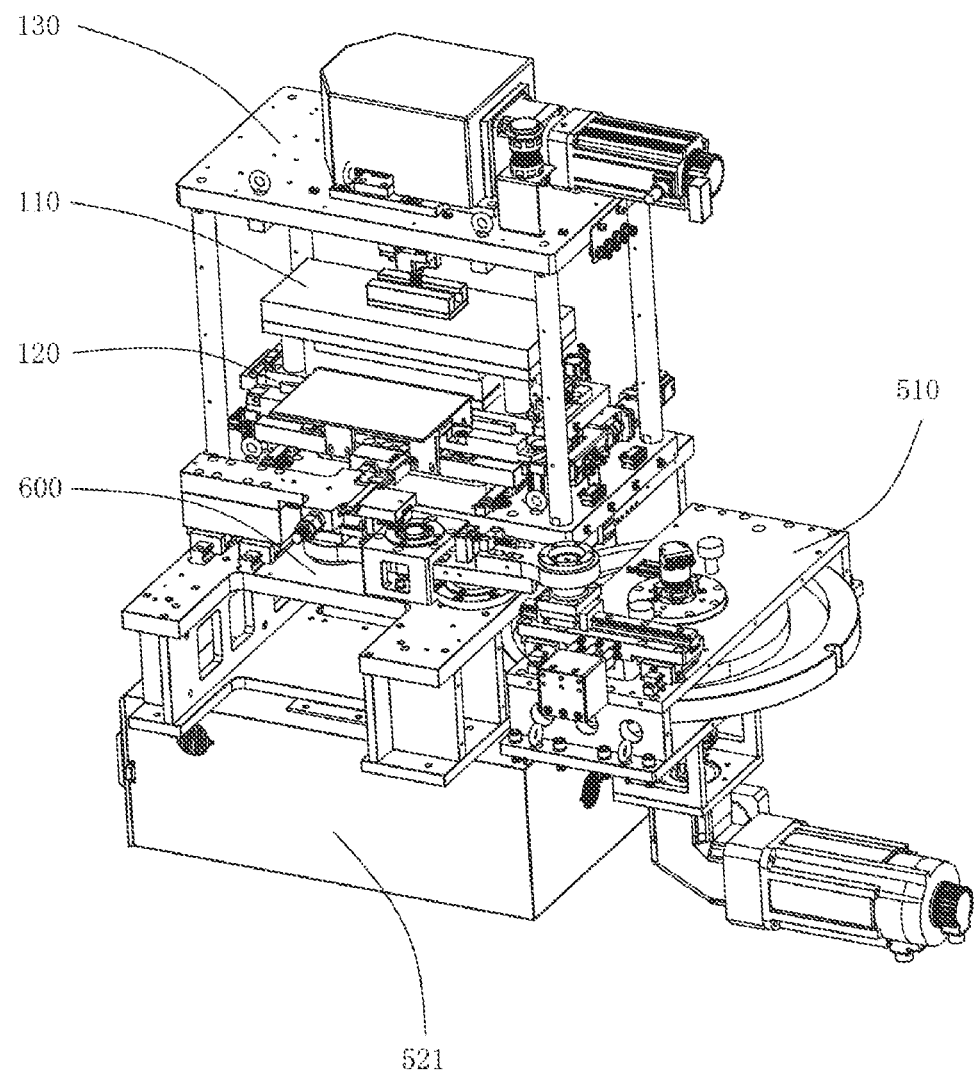
FIG. 6 is an isometric schematic diagram of a die-cutting module and a relevant structure according to an embodiment of the present application.
Figure 8:
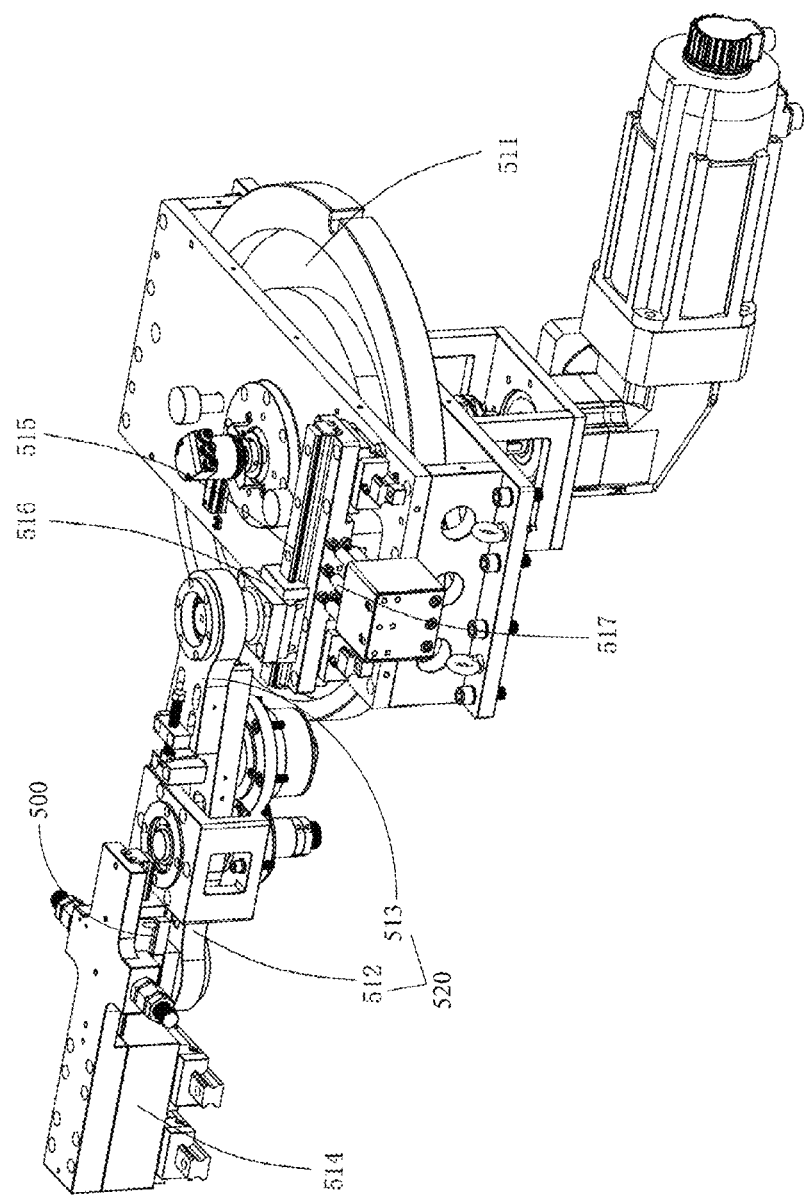
FIG. 8 is an isometric schematic diagram of a connecting rod unit according to an embodiment of the present application.

Referring to the embodiments shown in FIGS. 6 and 8, the swing rod 520 comprises a first arm 512 and a second arm 513, the second arm 513 is mounted on the first arm 512, the first arm 512 is connected to the first die frame 130, and the second arm 513 is connected to the cam 511 and is adjustable in mounting position. The movement range of the die-cutting module 100 can be adjusted by adjusting the position of the second arm 513. The connecting rod unit 510 further comprises a connecting seat 514, the connecting seat 514 is fixed on the first die frame 130, and the first arm 512 is connected to the connecting seat 514 by means of a guide rail and slider mechanism 500. The strip material cutting device further comprises a rack 600 on which the swing rod 520 is articulately mounted, and the connecting seat 514 and the first die frame 130 are each mounted on the rack 600 by means of a guide rail and slider mechanism 500. The connecting seat 514 and the first arm 512 can move relative to each other such that it is possible to provide a sufficient degree of freedom when the swing rod 520 swings and changes in length.

According to some embodiments of the present application, the cam 511 is provided with a cam groove, and the connecting rod unit 510 comprises a second sliding seat 515, a second sliding table 516, a first sliding seat and a first sliding table; the first sliding seat extends in a first direction, the first direction is parallel to the conveying direction of the strip material, and the first sliding table is mounted on the first sliding seat; the second sliding seat 515 is mounted on the second sliding table and extends in a second direction, the second sliding table 516 is mounted on the second sliding seat 515, the second sliding seat 515 is connected to the cam groove, and the second sliding table 516 is connected to the swing rod 520. The second sliding seat 515, the second sliding table 516, the first sliding seat and the first sliding table similarly play the role of enabling free movement.

In some embodiments, the connecting rod unit 510 further comprises a third elastic member 517, and the third elastic member 517 is connected to the second sliding seat 515 and is configured for driving the second sliding seat 515 to compress a side wall of the cam groove. It can be understood that due to factors such as a design margin and a machining error, there will be a certain gap between the second sliding seat 515 and the cam groove, such that the third elastic member 517 can ensure that the second sliding seat 515 is in close contact with the cam groove, thereby decreasing errors.

According to some embodiments of the present application, the strip material cutting device comprises a cutting module 300; the cutting module 300 is located downstream of the die-cutting module 100 and is capable of moving in a reciprocating manner along the conveying line of the strip material, and the cutting module 300 comprises a second upper cutting die 310 and the second lower cutting die 320; the second upper cutting die 310 and the second lower cutting die 320 can move close to each other so as to cut off the strip material. The die-cutting module 100 forms the contour first by cutting the strip material, and then the cutting module 300 cuts off the strip material, thereby obtaining a single electrode plate. The cutting module 300 cuts off the strip material in the die-cutting manner, such that the speed of cutting the strip material can be increased. Since the cutting module 300 cuts off only the strip material, the range in which the waste material generated is small, and the cutting module can be driven by the linear motor.

In some embodiments, the strip material cutting device comprises a second temporary storage module 400, the second temporary storage module 400 is located downstream of the die-cutting module 100, the cutting module 300 is located downstream of the second temporary storage module 400, and the second temporary storage module 400 is configured for enabling, during cutting, the cutting module 300 and the strip material to be relatively stationary in the conveying direction of the strip material. By providing the second temporary storage module 400, the quality of a cut of the strip material cut off by the cutting module 300 can be improved.

Figure 2:
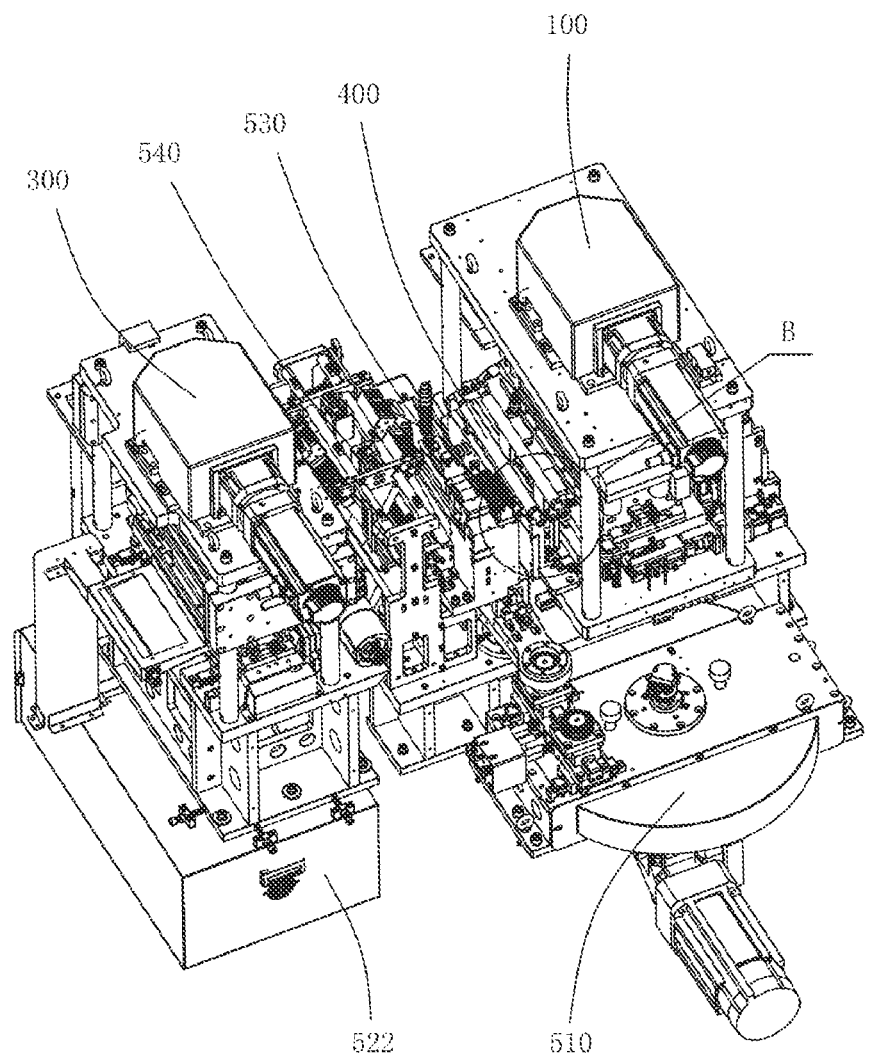
FIG. 2 is an isometric schematic diagram of the strip material cutting device according to the embodiment of the present application at another angle.
Figure 5:
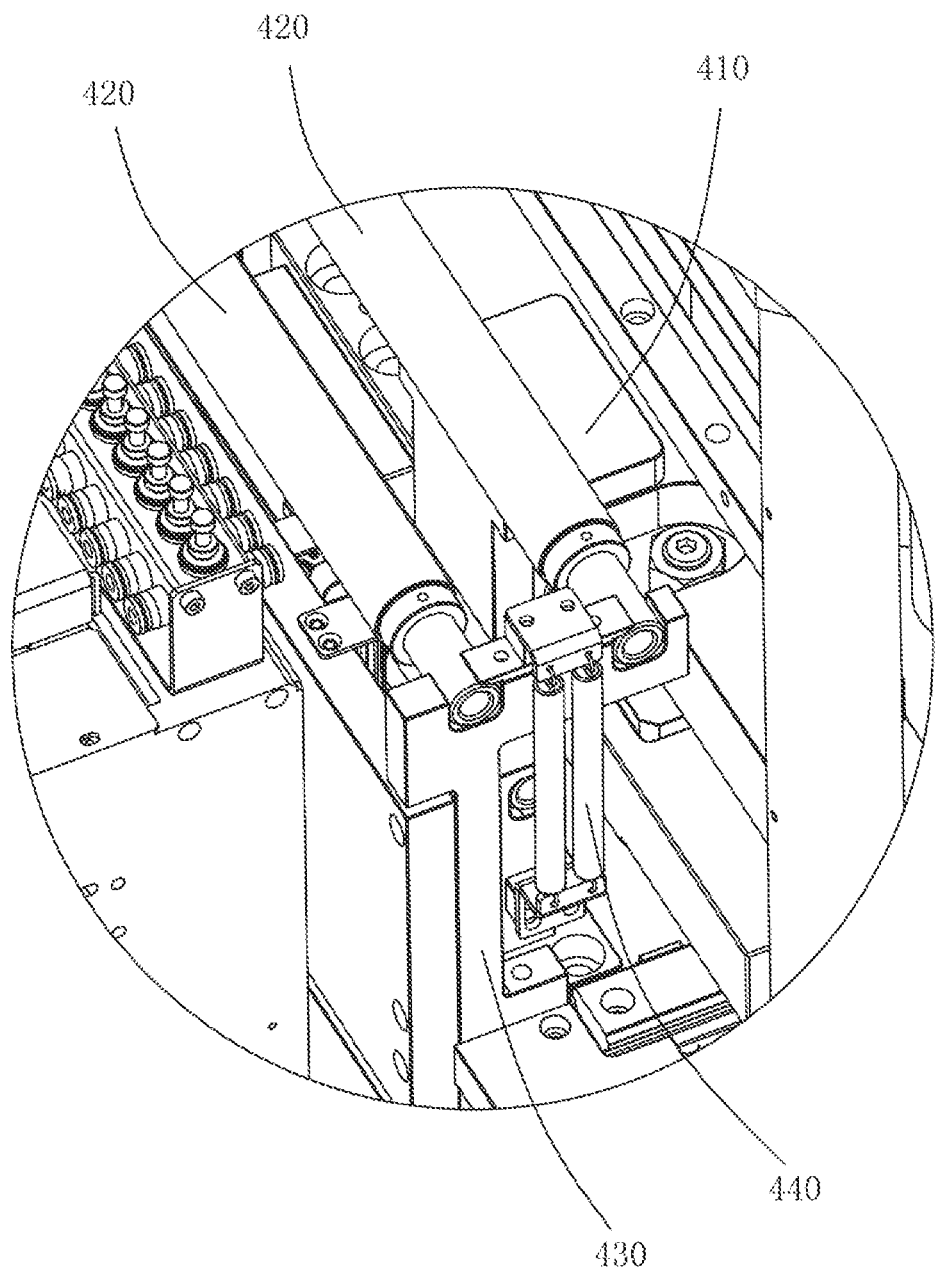
FIG. 5 is a partial enlarged view of part B in FIG. 2.

The second temporary storage module 400 comprises a second tension member 410 and a second temporary storage roller, and the second tension member 410 drives the first temporary storage roller to compress the strip material by exerting an acting force on the second temporary storage roller. Referring to FIGS. 2 and 5, in some embodiments, the second temporary storage module 400 comprises second delivery rollers 420 and a second guide rail; the two second delivery rollers 420 are arranged in a spaced manner, the second temporary storage roller is mounted on the second guide rail, and the second temporary storage roller is located between the two second delivery rollers 420 and is capable of moving close to or far away from the second delivery rollers 420. The second temporary storage module 400 comprises a second mounting rack 430 and a second movable frame, the second delivery rollers 420 and the second guide rail are mounted on the second mounting rack 430, the second movable frame is mounted on the second guide rail, and the second temporary storage roller is mounted on the second movable frame and located between the two second delivery rollers 420. The strip material passes between the second temporary storage roller and the second delivery rollers 420, and the second temporary storage roller moves along the second guide rail so as to temporarily store or release the strip material. The second tension member 410 may be a linear motor.

According to some embodiments of the present application, the strip material cutting device comprises a first waste material box 521 and a second waste material box 522, the first waste material box 521 comprises a first waste material inlet located below the die-cutting module 100, and the second waste material box 522 comprises a second waste material inlet located below the cutting module 300. The waste material generated during cutting is collected into the first waste material box 521 and the second waste material box 522, thereby avoiding interference with other structures of the strip material cutting device.

According to some embodiments of the present application, the strip material cutting device comprises a dust removal unit 530 and a detection unit 540, the dust removal unit 530 and the detection unit 540 are both located between the die-cutting module 100 and the cutting module 300, the detection unit 540 is located downstream of the dust removal unit 530 and comprises a detection camera, and the dust removal unit 530 comprises an air knife and a brush. The dust removal unit 530 removes the waste material and debris on the strip material by virtue of wind and friction, and the detection camera detects the die-cutting quality of the strip material.

The stacking apparatus according to the application comprises the strip material cutting device provided by the present application.

According to the stacking apparatus according to the application, by using the strip material cutting device provided by the present application, the first temporary storage module 200 can temporarily store or release a part of the strip material when the die-cutting module 100 cuts the strip material, thereby better ensuring, during cutting, the relative stationary state of the die-cutting module 100 and the strip material in the conveying direction of the strip material.

The following will describe in detail the strip material cutting device according to the present application in a specific embodiment with reference to FIGS. 1 to 8. It should be understood that the following description is only illustrative rather than being construed as a specific limitation on the present application.

Figure 3:
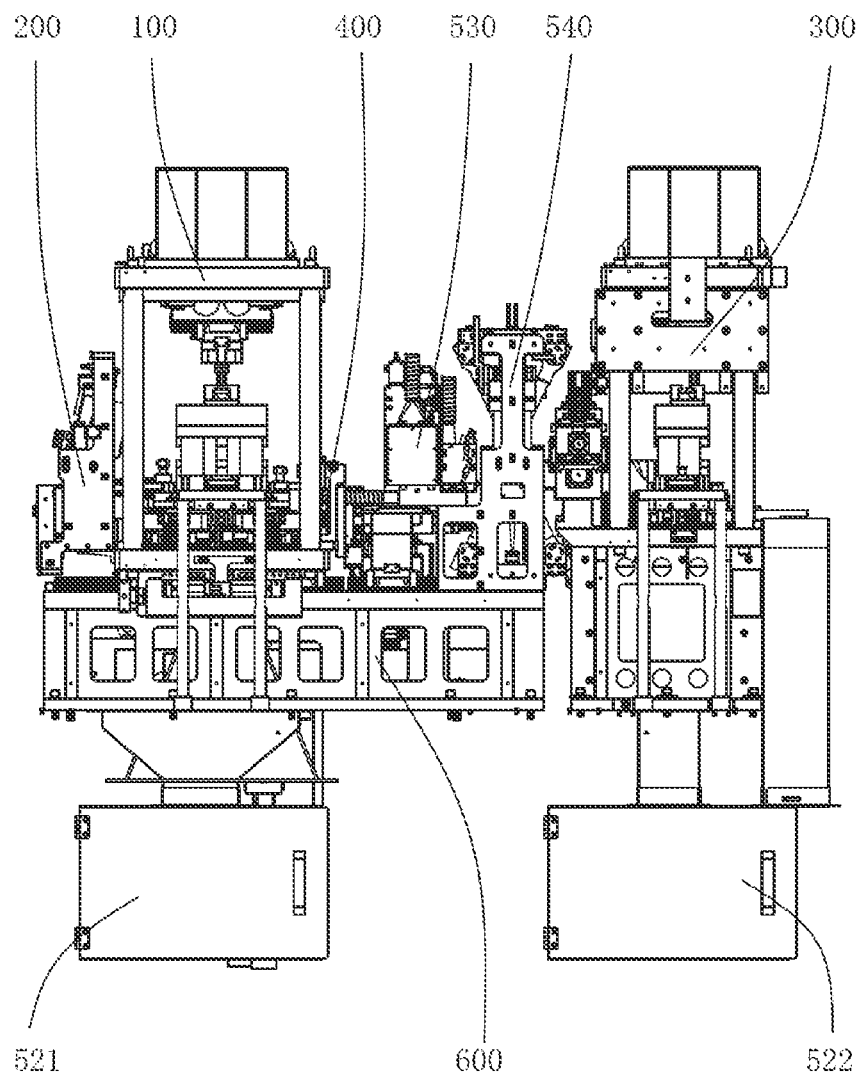
FIG. 3 is a schematic side view of the strip material cutting device according to the embodiment of the present application.

Referring to FIGS. 1, 2 and 3, the strip material cutting device comprises the rack 600 on which the first temporary storage module 200, the die-cutting module 100, the second temporary storage module 400 and the cutting module 300 are arranged in sequence. The connecting rod unit 510, the dust removal unit 530 and the detection unit 540 are further arranged on the rack 600, the connecting rod unit 510 is located on one side of the die-cutting module 100, the dust removal unit 530 and the detection unit 540 are located between the die-cutting module 100 and the cutting module 300, and the detection unit 540 is located downstream of the dust removal unit 530.

The strip material cutting device comprises the first waste material box 521 and the second waste material box 522, the first waste material box 521 comprises the first waste material inlet located below the die-cutting module 100, and the second waste material box 522 comprises the second waste material inlet located below the cutting module 300.

Referring to FIGS. 6 and 8, the die-cutting module 100 comprises the first upper cutting die 110, the first lower cutting die 120 and the first die frame 130; the first upper cutting die 110 is mounted on the rack 600 by means of the guide rail and slider mechanism 500, the first upper cutting die 110 and the first lower cutting die 120 are mounted on the first die frame 130 and capable of moving close to each other so as to cut the strip material.

The connecting rod unit 510 comprises the cam 511, the swing rod 520 and the connecting seat 514; the swing rod 520 is articulately mounted on the rack 600, the connecting seat 514 is mounted on the rack 600 by means of the guide rail and slider mechanism 500, and the connecting seat 514 is fixed to the first die frame 130; one end of the swing rod 520 is connected to the connecting seat 514 by means of the guide rail and slider mechanism 500, and the other end of the swing rod 520 is connected to the cam 511. The cam 511 can drive the swing rod 520 to swing, driving the die-cutting module 100 to cut the strip material in a follow-up manner.

The cam 511 is provided with the cam groove, and the connecting rod unit 510 comprises the second sliding seat 515, the second sliding table 516, the first sliding seat and the first sliding table; the first sliding seat extends in the first direction, the first direction is parallel to the conveying direction of the strip material, and the first sliding table is mounted on the first sliding seat. The second sliding seat 515 is mounted on the second sliding table and extends in the second direction, the second sliding table 516 is mounted on the second sliding seat 515, the second sliding seat 515 is connected to the cam groove, and the second sliding table 516 is connected to the swing rod 520. The connecting rod unit 510 further comprises the third elastic member 517, and the third elastic member 517 is connected to the second sliding seat 515 and is configured for driving the second sliding seat 515 to compress the side wall of the cam groove.

The swing rod 520 comprises the first arm 512 and the second arm 513, the second arm 513 is mounted on the first arm 512, the first arm 512 is connected to the first die frame 130, and the second arm 513 is connected to the cam 511 and is adjustable in mounting position.

Referring to FIGS. 1 and 4, the first temporary storage module 200 comprises the first tension member 210, the first temporary storage roller, the first delivery rollers 220, the first guide rail, the first mounting rack 230, the first elastic member 240 and the first movable frame. The first mounting rack 230 is mounted on the rack 600, the first delivery rollers 220 and the first guide rail are mounted on the first mounting rack 230, and the two first delivery rollers 220 are arranged in the spaced manner. The first movable frame is mounted on the first guide rail, the first temporary storage roller is mounted on the first movable frame, and the first temporary storage roller is located between the two first delivery rollers 220. The first elastic member 240 is a tension spring. One end of the first elastic member 240 is connected to the first mounting rack 230, and the other end of the first elastic member 240 is connected to the first movable frame. The first elastic member 240 balances the gravity of the first temporary storage roller, the strip material passes between the first temporary storage roller and the first delivery rollers 220, and the first tension member 210 is the linear motor. The first tension member is connected to the first movable frame, the first tension member exerts a constant driving force on the first temporary storage roller, and the first temporary storage roller moves along the first guide rail so as to temporarily store or release the strip material.

Figure 7:
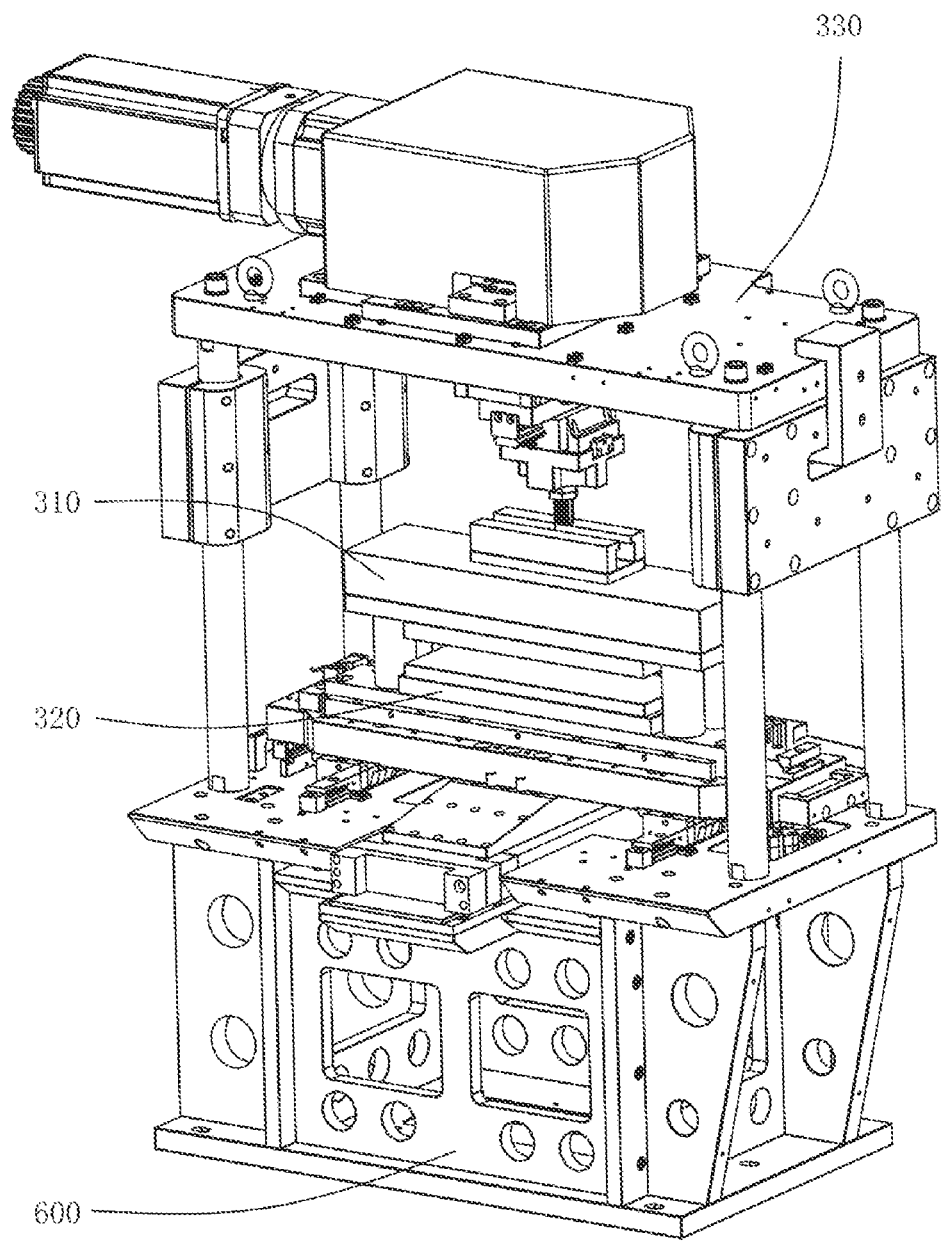
FIG. 7 is an isometric schematic diagram of a cutting module and a relevant structure according to an embodiment of the present application.

Referring to FIG. 7, the cutting module 300 comprises the second upper cutting die 310, the second lower cutting die 320 and the second die frame 330, and the second die frame 330 is mounted on the rack 600 by means of the guide rail and slider mechanism 500, the second upper cutting die 310 and the second lower cutting die 320 are mounted on the second die frame 330, and the second upper cutting die 310 and the second lower cutting die 320 are capable of moving close to each other so as to cut off the strip material.

Referring to FIGS. 2 and 5, the second temporary storage module 400 comprises the second tension member 410, the second temporary storage roller, the second delivery rollers 420, the second guide rail, the second mounting rack 430, the second elastic member 440 and the second movable frame. The second delivery rollers 420 and the second guide rail are mounted on the second mounting rack 430, the two second delivery rollers 420 are arranged in the spaced manner, the second movable frame is mounted on the second guide rail, and the second temporary storage roller is mounted on the second movable frame and is located between the two second delivery rollers 420. The second elastic member 440 is a tension spring, one end of the second elastic member 440 is connected to the second mounting rack 430, and the other end of the second elastic member 440 is connected to the second movable frame. The strip material passes between the second temporary storage roller and the second delivery rollers 420, the second tension member 410 is the linear motor, the second tension member 410 is connected to the second movable frame, and the second tension member 410 drives the second temporary storage roller to compress the strip material by exerting the acting force on the second temporary storage roller. The second temporary storage roller moves along the second guide rail so as to temporarily store or release the strip material.

The dust removal unit 530 comprises the air knife and the brush, and the detection unit 540 comprises the detection camera. The dust removal unit 530 removes the waste material and debris on the strip material by virtue of wind and friction, and the detection camera detects the die-cutting quality of the strip material.

According to the strip material cutting device in the embodiment of the present application, by adopting the above design, at least the following functions can be implemented. The strip material cutting device contours and machines the electrode plate by combining the follow-up cutting method and the die-cutting method, the die-cutting module 100 forms the contour of the electrode plate by cutting, and the cutting module 300 cuts off the strip material to obtain the electrode plate, so that the strip material cutting device can improve the contour-machining speed of the electrode plate. When the die-cutting module 100 performs cutting, the first temporary storage module 200 can compensate for the speed difference between the strip material and the die-cutting module 100, and when the cutting module 300 performs cutting, the second temporary storage roller can compensate for the speed difference between the strip material and the cutting module 300, so that the strip material cutting device can improve the quality of the cut edge.

In the description of the specification, the description with reference to terms such as "an embodiment", "some embodiments", "a schematic embodiment", "an example", "a specific example", or "some examples" means that specific features, structures, materials, or characteristics described in combination with the embodiments or examples are included in at least one embodiment or example of the present application. In this specification, the schematic expressions of the above terms do not necessarily refer to the same embodiments or examples. Moreover, the specific features, structures, materials, or characteristics described herein may be combined in any one or more embodiments or examples in a suitable manner.

Although the embodiments of the present application have been shown and described, those of ordinary skill in the art may appreciate that various changes, modifications, substitutions, and variations may be made to these embodiments without departing from the principle and gist of the present application, and the scope of the present application is defined by the appended claims and equivalents thereof.

What is claimed is:

1. A strip material cutting device, comprising:
    a die-cutting module, the die-cutting module being capable of moving in a reciprocating manner along a conveying line of a strip material, the die-cutting module comprising a first upper cutting die and a first lower cutting die, and the first upper cutting die and the first lower cutting die are capable of moving close to each other so as to cut the strip material; and
    a first temporary storage module, the first temporary storage module being located upstream of the die-cutting module, the first temporary storage module comprising a first temporary storage roller capable of moving to temporarily store or release the strip material, and the first temporary storage module being configured for enabling, during cutting, the die-cutting module and the strip material to be relatively stationary in a conveying direction of the strip material;
    wherein the first temporary storage module comprises a first tension member, and the first tension member drives the first temporary storage roller to compress the strip material by exerting an acting force on the first temporary storage roller;
    wherein the strip material cutting device comprises a connecting rod unit, the connecting rod unit is located on one side of the die-cutting module, connected to the die-cutting module, and configured for driving the die-cutting module to move in a reciprocating manner along the conveying line of the strip material;
    wherein the connecting rod unit comprises a cam and a swing rod, the cam is in transmission connection with the die-cutting module by means of the swing rod and is capable of driving the swing rod to swing;

wherein the swing rod comprises a first arm and a second arm, the second arm is mounted on the first arm, connected to the cam and adjustable in mounting position, the connecting rod unit comprises a connecting seat fixed on a first die frame, and the first arm is connected to the connecting seat by means of a guide rail and slider mechanism.

2. The strip material cutting device according to claim 1, wherein the first temporary storage module further comprises a first elastic member, and the first elastic member is configured for balancing the gravity of the first temporary storage roller by means of elasticity.

3. The strip material cutting device according to claim 1, wherein the first temporary storage module comprises first delivery rollers and a first guide rail, the first delivery rollers are arranged at an interval, and the first temporary storage roller is mounted on the first guide rail.

4. The strip material cutting device according to claim 1, wherein the cam is provided with a cam groove, and the connecting rod unit comprises a second sliding seat, a second sliding table, a first sliding seat and a first sliding table; the first sliding seat extends in a first direction, the first direction is parallel to the conveying direction of the strip material, and the first sliding table is mounted on the first sliding seat; the second sliding seat is mounted on the second sliding table and extends in a second direction, the second sliding table is mounted on the second sliding seat, the second sliding seat is connected to the cam groove, and the second sliding table is connected to the swing rod; the connecting rod unit further comprises a third elastic member, the third elastic member is connected to the second sliding seat, and the third elastic member is configured for driving the second sliding seat to compress a side wall of the cam groove.

* * * * *